April 4, 1950      G. A. TINNERMAN      2,502,539

FASTENING DEVICE

Filed Sept. 16, 1947

Inventor
GEORGE A. TINNERMAN

H. G. Lombard
Attorney

Patented Apr. 4, 1950

2,502,539

UNITED STATES PATENT OFFICE 2,502,539

FASTENING DEVICE

George A. Tinnerman, Cleveland, Ohio, assignor to Tinnerman Products, Inc., Cleveland, Ohio, a corporation of Ohio Application September 16, 1947, Serial No. 774,267

9 Claims. (Cl. 292—202)

This invention relates, in general, to spring fasteners for securing bolts or studs under spring tension, and deals, more particularly, with spring fastening devices for bolts and studs which are rotatable or turnable in an installation to actuate a rotary latch or catch or similar closure fastener for securing a door or closure panel, or the like.

The objects and advantages of the invention and new and useful features in the construction, arrangement and general combination of parts will be readily apparent as the following description proceeds with reference to the accompanying drawing, for purposes of illustration but not of limitation, in which like reference characters designate like parts throughout, and in which.

Figure 2:
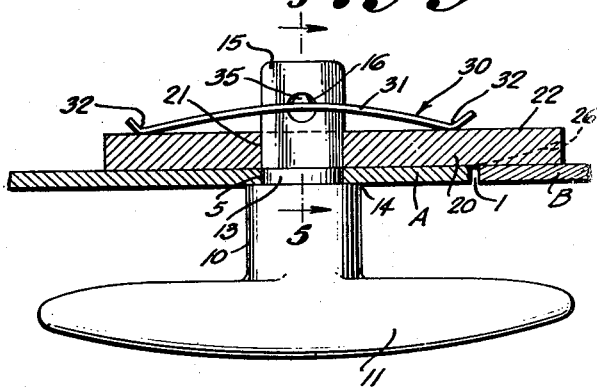
Fig. 2 is a sectional view of Fig. 1 along line 2—2 looking in the direction of the arrows.
Figure 3:
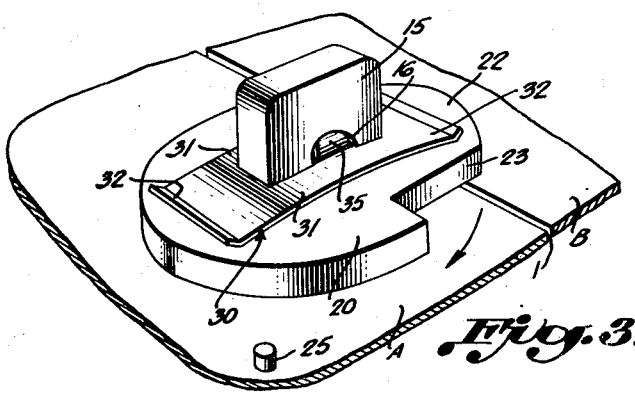
Fig. 3 is a perspective view showing the latch structure as viewed from the rearward side of Fig. 1.
Figure 7:
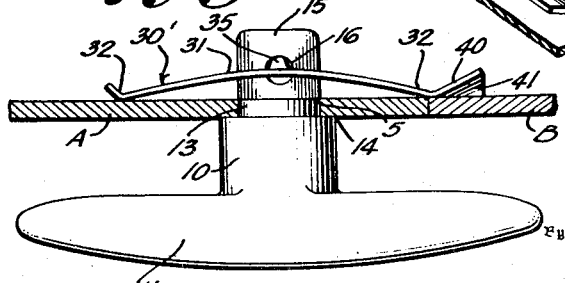
Figure 6:
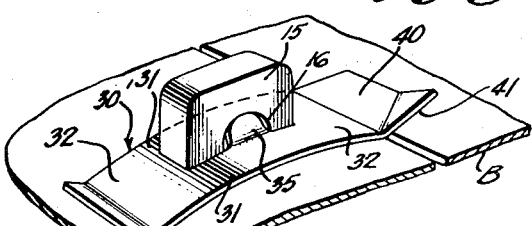

Fig. 6 is a sectional view similar to Fig. 2 showing another latch construction in which the spring nut device is designed to serve not only as the spring securing means for the bolt but also as the rotary latch or catch member; and Fig. 7 is a perspective view similar to Fig. 3 illustrating the general construction and arrangement of the combined spring nut and latch device of Fig. 6 in applied fastening position in a closure installation.

Figure 1:
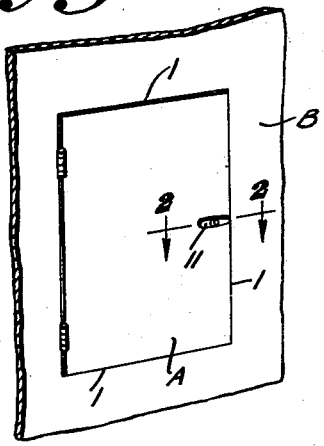
Fig. 1 is a perspective view of a door or other panel closure illustrating a typical installation in which the improved closure fastener of the invention is employed for securing and retaining the door or panel in tightly shut position.

Referring now, more particularly, to the drawing, Fig. 1 illustrates a typical mounting of a door, panel or other closure as an example of one type of installation in which the improved fastening means of the invention is employed. It will be understood that though the fastening means is disclosed in connection with the closure fastener for such a closure installation, it has a wide range and variety of other applications and uses as a fastener of general utility for securing any two or more parts in an assembly under continuously effective spring clamping force. In the present example, there is shown by way of illustration, a rotary latch or turn-catch type of closure fastener for releasably securing a door A, panel or other closure adapted to open outwardly from an opening 1 of complementary contour in the wall B, frame or other structure. In closed position, the rearward face of the door is in substantially flush relation or in line with the marginal portion of the wall B, frame or other support. In the event that the marginal portion of the door in closed position is offset with respect to the wall B, an equivalent arrangement is provided in any suitable manner by a backing plate or strike plate attached to the inner surface of said wall B in substantially flush relation to the adjacent marginal portion of the door.

The closure fastener comprises a shank 10 carrying a handle 11 of any suitable design or shape in projecting relation to the outer surface of door A. The shank 11 may be of any length, size or cross-section and in the present example, is shown provided with a cylindrical reduced portion 13 defining a cylindrical bearing surface for the shank, and a shoulder or head 14 adjacent said cylindrical bearing portion. The extremity of the shank 10 is formed in the manner of a flat, rectangular stud or stem 15 which is integral with and in continuation of the cylindrical bearing portion 13 and which is provided with a transverse hole or aperture 16 at a predetermined location depending on the combined thickness of the parts of the assembly in secured relation. The handle member 11 thus provided is adapted to be mounted on the door A with the stud 15 and cylindrical bearing portion 13 extending through a passage 5 in said door. The passage 5 is circular and of a size approximating the cross-section of the cylindrical bearing portion 13 on the shank for receiving said bearing portion snugly in rotatable relation to the door and with the adjoining shoulder 14 on the shank in abutting engagement with the adjacent outer surface of the door to support the handle rigidly in mounted position on said door.

The flat stud 15, accordingly, extends in projecting relation to the rearward side of the door A and supports a latch or catch member 20 attached to the projecting free end of said stud. The latch 20 is a substantial plate-like device provided with a rectangular opening 21, Figs. 2 and 5, corresponding to the cross-section of the rectangular stud 15 in a manner whereby the latch is nonrotatably supported on the stud but adapted for ready turning movement in response to turning force on the handle 11. The latch 20 includes at its forward end a catch portion 22, Figs. 2 and 3, and at one side of said catch a notch defines a shoulder 23 which is adapted to engage a stop pin 25 on the door or panel A to limit the movement of the latch when turned toward released position in the direction indicated by the arrow in Fig. 3. Preferably an opposite segment of the inner face of the catch portion 22 is tapered to define a cam surface 26, Figs. 2 and 5, adapted to facilitate the initial engagement of the latch with the door frame or wall B when the latch is turned to securing position.

Figure 4:
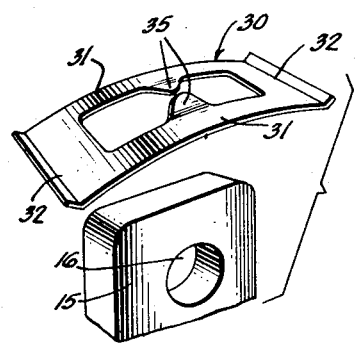
Fig. 4 is a perspective view showing the improved spring nut device in the general position for application to the projecting free end of the associated bolt shank or stud.

The handle shank 10 and latch are positively secured in the assembled relation shown by a relatively simple form of combined spring, washer and nut device 30, Fig. 4, connected to the projecting free end of the flat stud 15 and having means adapted to provide a positive interlock with said flat stud through the transverse hole 16 therein. The spring nut devices 30 are essentially sheet metal locking plates or clips which are constructed from relatively thin sections of any suitable sheet metal, preferably spring metal such as spring steel or cold rolled steel having spring like characteristics. The spring nut devices may be formed from blanks of various outlines, but from the standpoint of most economical quantity production are most advantageously provided from a simple generally rectangular blank which may be obtained at relatively low cost from standard sheet metal strip stock with little loss or waste of material. The blank is bent into the form of a pronounced generally bowed or arched body having a rectangular cutout or stud passage defining side or bridge sections 31 extending generally longitudinally of the blank and joined by end sections 32. The end sections 31 provide spring clamping or pressure surfaces which are preferably rounded for slight sliding relation to the adjacent surface of the latch or other part secured upon compression of the spring nut device in the application thereof to applied fastening position, as presently to be described.

The rectangular stud passage in the fastener 30 extends in opposite directions a substantial equal distance from the center or the apex of the arched or bowed fastener body. At such apex a pair of tongues 35 is provided preferably by integral projections on the inner edges of the side or bridge portions 31 of the fastener body and extend inwardly toward each other in opposing relation in the area of the stud passage. The tongues 35 are bent slightly upwardly above the apex of the bowed fastener body and are so designed as to be readily received in the transverse hole 16 in the flat stud 15 from opposite faces thereof.

Figure 5:
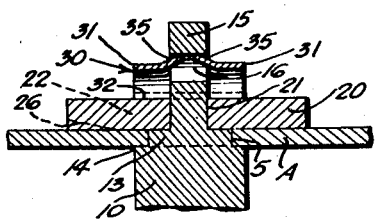
Fig. 5 is a sectional view of Fig. 2 taken along line 5—5, looking in the direction of the arrows.

The general outline of the rectangular slot in the fastener body is of a size corresponding substantially to the cross-section of the flat stud 15, in a manner whereby the fastener 30 is non-rotatably connected to the stud when attached thereto. The tongues 35 are slightly yieldable with respect to the generally bowed or arched fastener body and relatively to each other in such a way that the extremities thereof are adapted to snap over the free end of the flat stud 15 and spread apart sufficiently to slide along the flat faces of the stud to the position in which said tongues are free to snap into the transverse hole 16 in the flat stud from opposite faces thereof. The spring nut device 30, accordingly, may be speedily installed on the flat stud 15 by a substantial axial, thrust like force by which the tongues 35 are snapped into connected engagement in the transverse hole 16, and the generally bowed or arched fastener body simultaneously compressed in such applied fastening position to secure the parts of the completed assembly substantially as shown in Figs. 2 and 3. When thus compressed in applied fastening position, the rounded end sections 32 of the spring nut 30 slide slightly outwardly on the adjacent surface of the latch and exert a continuously effective spring clamping force on said latch against the inner surface of the door panel A. Under the spring tension set up in the fastener body in compressed condition, the extremities of the tongues 35 are positively locked in abutting relation with the adjacent upper wall of the transverse hole 16 in the flat stud, as shown in Fig. 5, to exert a constant axial drawing action on the stud and thereby maintain the handle shank 10 in rigid mounted position on the door, and the latch plate 20 in firmly clamped relation against the door panel A under continuously effective spring tension. The bending of the tongues 35 slightly upwardly defines a flared entrance to the space between said tongues which facilitates the initial application of the spring fastener over the projecting free end of the apertured stud 15 and otherwise enables said tongues to cam readily outwardly over the end edges of said stud as necessary to pass into engagement with the flat faces of the stud and thence into interlocking relation in the aperture 16, as aforesaid. The extremities of the tongues 35 preferably are rounded on a radius corresponding substantially to the radius of the aperture or hole 16 in the stud, so that said extremities have a uniform, positive bearing contact in abutting engagement with the rounded upper wall portion of said aperture 16 in the most effective manner. Likewise, in the event that the aperture 16 is a slot-like recess, the extremities of the tongues would preferably be provided in the manner of straight edges adapted for uniform positive bearing contact with the flat wall of the slot-like recess.

In any case, it will be understood that the stud 15 functions in the manner of a bolt to fasten the secured parts of the assembly, and the hole or aperture 16 therein is provided thereon in a predetermined location depending on the most effective disposition of the tongues 35 relative to the stud in the compressed condition of the fastener 30, which of course, is governed by the size and strength of the spring nut for any particular installation, and the degree to which the bowed body of the spring nut is compressed for any necessary or desirable spring clamping force on the secured parts of the assembly.

From the foregoing, it will be understood that the described closure fastener involves a highly simplified construction which is adapted for assembly on the door A in a minimum of time and effort simply by passing the handle shank 10 through the passage 5 to the position shown in Fig. 2 wherein the stud 15 extends in projecting relation to the rearward side of the door. The latch plate 20 is then attached by passing the projecting free end of the stud 15 through the opening 21 in said latch, whereupon the combined spring, washer and nut device 30 is easily and quickly connected to the stud by a simple axial thrust-like motion, substantially as described, to secure the completed assembly.

The spring nut in compressed condition is positively locked to the stud 15 by the tongues 35 received in the aperture 16 therein while both the spring nut 30 and the latch plate 20 are secured in nonrotatable relation to the handle shank 10 by reason of the flat formation of the stud 11 which is received in the complementarily shaped rectangular opening 21 in the latch plate and the similar rectangular stud opening in the spring nut 30. Inasmuch as the handle shank 10 as mounted on the door A is rotatable by reason of the cylindrical bearing 13 seated in the circular passage 5, the stud 15, latch plate 20 and spring nut 30 are rotatable as a unit to actuate the latch 20 to securing or released position, as desired. Accordingly, in the present example, it will be understood that in the closed position of the door, the latch 20 is disposed substantially as shown in Fig. 3 with the catch portion 22 bearing on the adjacent surface of the frame B under the resilient spring force of the spring nut 30 to maintain the door in tightly shut position.

To open the door, the handle is turned to rotate the latch 20 in the direction of the arrow in Fig. 3 to a position in which the catch 22 is out of engagement with the wall or frame B. This rotary movement of the latch to releasing position is limited by the stop pin 25 in the path of the shoulder 23 which prevents any possible overtravel of the latch to a position in which it would extend beyond the edge of the door and thereby prevent subsequent closing of the door. However, the latch 20 need be turned only as necessary to release the door, and in any such released position, it is held in fixed relation on the door by the spring force of the spring nut 30 clamping the latch in frictional engagement with the adjacent inner face of the door. Thus, in this respect also, there is no tendency for the latch to drop or otherwise become displaced to a position in which it would extend beyond the edge of the door when opened and thereby prevent the subsequent closing of the door.

When the latch has been turned to released position for opening the door, subsequent closing and latching of the door is accomplished simply by a reverse turning of the latch to its initial position shown in Fig. 3. This is facilitated by the cam surface 26 on the catch, Figs. 2 and 5, which is designed for gradual camming action against the engaged portion of the wall or frame B under the resilient spring force of the spring nut 30 as the latch is rotated to draw the door A tightly shut.

Figs. 6 and 7 disclose another form of the invention which is particularly useful as a closure fastener for lightweight installations. The combined spring, washer and nut member 30' has the same general construction as that described with reference to Figs. 1–5 inclusive for interlocking fastening engagement with the apertured stud 15 to mount the handle shank 10 on the door A under axial spring force but capable of ready rotation relative thereto. This form of the invention is even further simplified in that the latching means is provided by an integral extension 40 on the spring fastener body 30' that serves as the catch which is turned into and out of engagement with the wall or door frame B. Preferably the catch 40 includes an upturned corner portion 41 which defines a cam surface adapted to effect a gradual camming action on the wall or door frame B as the latch is rotated into engagement therewith to draw the door tightly shut and to maintain the same in tightly shut position.

The combined spring, washer and nut fastening device in any form preferably is constructed of relatively thin sheet metal, the thickness of which is selected according to service requirements and the predetermined size of the parts of the closure fastener installation. The spring nut fasteners are most effective when provided of spring metal suitably spring tempered and otherwise treated to give the desired toughness and hardness, particularly in the case of devices which are used in heavy duty installations. A cheap but effective fastener for similar installations may be provided from cold rolled metal, such as cold rolled steel which is untempered but of a spring metal nature and capable of providing a strong, durable and reliable fastening installation.

While the invention has been described in detail with specific examples, such examples are intended as illustrations only since it will be apparent that other modifications in the construction, arrangement and general combination of parts may be devised without departing from the spirit and scope of the invention. The present embodiments are therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed is:

1. A spring nut device comprising an arched sheet metal plate provided with a passage for a stud having a transverse hole and a tongue attached to the apex of said arched plate and projecting into said stud passage in position to be received in said transverse hole in the stud.

2. A spring nut device comprising an arched sheet metal plate provided with a passage for a stud having a transverse hole, and a pair of cooperating tongues attached to the apex of said arched plate and projecting into said stud passage in position to be received in said transverse hole in the stud at opposite sides of said stud.

3. A spring nut device comprising an arched sheet metal plate provided with a generally rectangular passage for receiving a stud of generally rectangular cross-section and having a transverse hole through said stud, and a pair of tongues attached to the apex of said arched plate and projecting into the generally rectangular stud passage in position to enter said transverse hole in the stud from opposite sides of said stud.

4. Fastening means comprising a stud provided with a preformed transverse hole and a nut device comprising a sheet metal body having a passage for said stud and a tongue adjacent said passage adapted to be received in and surrounded by the wall of said transverse hole in the stud in the fastening position of the nut device on said stud.

5. Fastening means comprising a stud of generally rectangular cross-section provided with a preformed transverse hole, and a nut device comprising a sheet metal body having a generally rectangular passage for said stud and a tongue adjacent said passage adapted to be received in and surrounded by the wall of said transverse hole in the stud in the fastening position of the nut device on said stud.

6. An installation comprising a stud provided with a preformed transverse hole and projecting through a passage in a support, a rigid latch plate having an opening receiving said stud, and a spring nut device secured to said stud and bearing resiliently on said latch plate comprising a sheet metal body having a passage for said stud and a tongue adjacent said passage received in and surrounded by the wall of the transverse hole in the stud.

7. An installation comprising a stud projecting through a passage in a support and provided with a preformed transverse hole through said stud, a rigid latch plate having an opening receiving said stud, and a spring nut device secured to said stud and bearing resiliently on said latch plate comprising a sheet metal body having a passage for said stud and a pair of cooperating tongues adjacent said passage received in and surrounded by the wall of the transverse hole in the stud at opposite sides of said stud.

8. An installation comprising a stud projecting through a passage in a support and provided with a preformed transverse hole through said stud, a rigid latch plate having an opening receiving said stud, and a spring nut device secured to said stud and bearing resiliently on said latch plate comprising an upwardly arched sheet metal body having a passage for said stud and a tongue adjacent said passage at the apex of said arched body received in and surrounded by the wall of the transverse hole in the stud.

9. An installation comprising a stud projecting through a passage in a support, said stud being provided with opposite flat faces and a preformed transverse hole through the stud, a rigid latch plate having an opening receiving said stud, and a spring nut device secured to said stud and bearing resiliently on said latch plate comprising a sheet metal body having a stud passage including straight portions adjacent the flat faces of the stud, and a pair of cooperating tongues adjacent said stud passage received in and surrounded by the wall of the transverse hole in the stud.

GEORGE A. TINNERMAN.

REFERENCES CITED

The following references are of record in the file of this patent:

UNITED STATES PATENTS

| Number | Name | Date |
|---|---|---|
| 386,549 | Matthews | July 24, 1888 |
| 512,996 | Waddell | Jan. 16, 1894 |
| 858,091 | Merriweather | June 25, 1907 |
| 1,512,653 | Tinnerman | Oct. 21, 1924 |
| 2,272,145 | Anderson et al. | Feb. 3, 1942 |
| 2,409,822 | Allen | Oct. 22, 1946 |